United States Patent
Rodene et al.

(10) Patent No.: US 12,467,151 B2
(45) Date of Patent: Nov. 11, 2025

(54) PURE-PHASE CUBIC $Ni_{1-x}Mo_x$ ALLOY NANOPARTICLES AS LOW-COST AND EARTH ABUNDANT ELECTROCATALYSTS

(71) Applicant: VIRGINIA COMMONWEALTH UNIVERSITY, Richmond, VA (US)

(72) Inventors: Dylan D. Rodene, Ponte Vedra, FL (US); Ebtesam H. Eladgham, Richmond, VA (US); Indika U. Arachchige, Henrico, VA (US); Ram B. Gupta, Glen Allen, VA (US)

(73) Assignee: Virginia Commonwealth University, Richmond, VA (US)

( * ) Notice: Subject to any disclaimer, the term of this patent is extended or adjusted under 35 U.S.C. 154(b) by 813 days.

(21) Appl. No.: 18/004,706

(22) PCT Filed: Sep. 2, 2020

(86) PCT No.: PCT/US2020/049023
§ 371 (c)(1),
(2) Date: Jan. 9, 2023

(87) PCT Pub. No.: WO2021/046099
PCT Pub. Date: Mar. 11, 2021

(65) Prior Publication Data
US 2023/0250515 A1    Aug. 10, 2023

Related U.S. Application Data

(60) Provisional application No. 62/895,534, filed on Sep. 4, 2019.

(51) Int. Cl.
| | | |
|---|---|---|
| *C22C 1/04* | (2023.01) |
| *B22F 1/05* | (2022.01) |
| *B22F 1/054* | (2022.01) |
| *B22F 1/07* | (2022.01) |
| *B22F 9/24* | (2006.01) |
| *C22C 19/03* | (2006.01) |
| *C25B 1/04* | (2021.01) |
| *C25B 11/089* | (2021.01) |

(52) U.S. Cl.
CPC ............ *C22C 1/0433* (2013.01); *B22F 1/054* (2022.01); *B22F 1/07* (2022.01); *B22F 9/24* (2013.01); *C22C 19/03* (2013.01); *C25B 1/04* (2013.01); *C25B 11/089* (2021.01); *B22F 2201/11* (2013.01); *B22F 2301/15* (2013.01); *B22F 2304/054* (2013.01)

(58) Field of Classification Search
CPC ....... C22C 1/0433; C22C 19/03; B22F 1/054; B22F 1/07; B22F 2304/054; C25B 1/04; C25B 11/089
See application file for complete search history.

(56) References Cited

U.S. PATENT DOCUMENTS

| | | |
|---|---|---|
| 2008/0131735 A1 | 6/2008 | Das et al. |
| 2008/0164141 A1 | 7/2008 | El-Shall et al. |
| 2012/0313073 A1 | 12/2012 | Mckone et al. |

FOREIGN PATENT DOCUMENTS

| | | |
|---|---|---|
| CN | 108425131 A | 8/2018 |
| CN | 109569446 A | 4/2019 |

*Primary Examiner* — Jessee R Roe
(74) *Attorney, Agent, or Firm* — WCF IP

(57) ABSTRACT

Low-cost and earth abundant, $Ni_{1-x}Mo_x$ alloy nanocrystals, with sizes ranging from 18-43 nm and varying Mo composition (0.0-11.4%), were produced by a colloidal chemistry method for alkaline HER reactions. For a water splitting current density of ~10 mA/cm², these alloys demonstrate over-potentials of −62 to −177 mV, which are comparable to commercial Pt-based electrocatalysts (−68 to −129 mV). The cubic $Ni_{0.934}Mo_{0.066}$ alloy nanocrystals exhibit the highest activity as alkaline HER electrocatalysts, outperforming commercial Pt/C (20 wt %) catalyst.

6 Claims, 4 Drawing Sheets

PURE-PHASE CUBIC $Ni_{1-x}Mo_x$ ALLOY NANOPARTICLES AS LOW-COST AND EARTH ABUNDANT ELECTROCATALYSTS

This invention was made with government support under Grant Number 1506595 awarded by the National Science Foundation (NSF). The government has certain rights in the invention.

FIELD OF THE INVENTION

The invention is generally related to catalysts and is, more particularly related to a new form of nickel (Ni) molybdenum (Mo) alloy, present in the form nanoparticles, which can function as a catalyst, and which has particular application for water splitting to produce hydrogen and in the petroleum industry for hydrodesulfurization.

BACKGROUND

Current state-of-the-art electrocatalysts and photocatalysts for water splitting reactions typically incorporate platinum group metals (PGMs) as the primary or secondary catalyst(s) for hydrogen evolution reactions (HER). The single-element cathodic earth-abundant electrocatalysts, such as Ni, Mo, Co, W, and Fe, typically exhibit high over-potentials (>150 mV) and low stability (<48 h) compared to PGM catalysts (~70 mV and >100 h, respectively) [1,2]. Both Ni and Mo are earth-abundant and significantly less expensive than PGMs (Pt, Mo, and Ni are about $29,000/kg, $26/kg, and $9/kg, respectively) [3].

SUMMARY

According to the invention, a colloidal synthesis method was developed to produce phase-pure cubic and hexagonal $Ni_{1-x}Mo_x$ alloy NPs with varying compositions of Mo (x=0.0-11.4%) for alkaline HER. The crystal structures and compositions of the $Ni_{1-x}Mo_x$ alloy NPs were tuned by varying the reaction temperature, heating rate, and concentration of the precursors and octadecene (ODE) and oleylamine (OLA) surfactants and solvents. It was found that the as-synthesized cubic alloys show significantly higher catalytic activity when compared to the hexagonal alloys for the HER. In general, HER activity increases with increasing Mo content up to 6.6% for the cubic alloys, followed by a decrease at 8.7% and 11.4%. The cubic $Ni_{0.934}Mo_{0.066}$ alloy NPs displayed the highest activity as alkaline HER electrocatalysts, rivalling commercial PGM catalysts. Overall, we have developed a new, earth abundant, nanostructured catalyst at significantly low-cost that can perform significantly better than current commercially available, expensive, and extremely rare PGM catalysts for HER (renewable and sustainable energy) applications.

DETAILED DESCRIPTION

Figure 1:
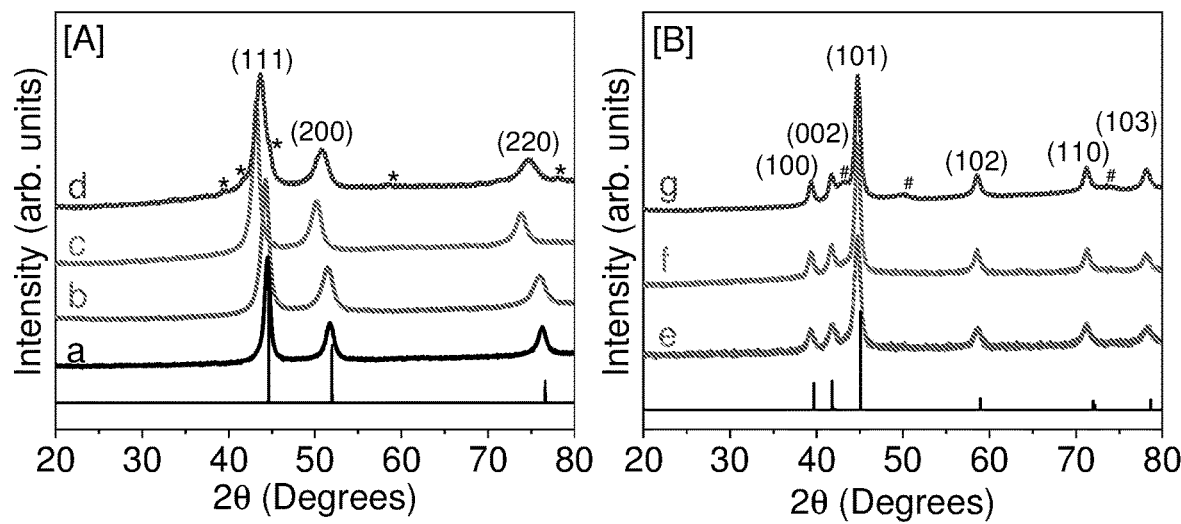
FIG. 1 presents in panels [A] and [B] powder X-ray diffraction patterns of [A] cubic and [B] hexagonal $Ni_{1-x}Mo_x$ alloy NPs produced with varying Mo concentrations: (a) x=0.011, (b) x=0.036, (c) x=0.066, (d) x=0.087, (e) x=0.012, (f) x=0.015, and (g) x=0.019. The vertical gray line shown in A corresponds to cubic Ni structure (JCPDS #01-070-0989) whereas the vertical gray line shown in B represents hexagonal Ni (JCPDS #01-089-7129) structure. The diffraction peaks corresponding to hexagonal and cubic $Ni_{1-x}Mo_x$ impurities are shown in * and #, respectively.

We report a synthesis of distinct crystal phases and compositions of $Ni_{1-x}Mo_x$ alloy nanoparticles (NPs) as low-cost, earth-abundant electrocatalysts for the hydrogen evolution reaction (HER) in alkaline medium. Phase-pure cubic and hexagonal Ni and $Ni_{1-x}Mo_x$ alloy NPs, with sizes ranging from 18-43 nm and varying Mo composition (0.0-11.4%), were produced by a low-temperature colloidal chemistry method. As-synthesized NPs show spherical to polygonal morphologies and a systematic shifting of Bragg reflections to lower 2θ angles with increasing Mo, suggesting the growth of homogeneous alloys. The cubic alloys exhibit significantly higher HER activity in comparison to the hexagonal alloys. For a current density of −10 mA/cm², the cubic alloys demonstrate over-potentials of −62 to −177 mV compared to −162 to −242 mV for the hexagonal alloys. The over-potentials of cubic alloys are comparable to the commercial Pt-based electrocatalysts for which the over-potentials range from −68 to −129 mV at −10 mA/cm². In general, a decrease in over-potential and an increase in HER activity was observed with increasing concentration of Mo for the cubic alloys. The cubic $Ni_{0.934}Mo_{0.066}$ alloy NPs exhibit the highest activity as alkaline HER electrocatalysts, outperforming commercial Pt/C (20 wt. %) catalyst.

In the practice of the invention, the nanoparticles will generally range from 10-100 nm, and most preferably from 15-50 nm, in size. The $Ni_{1-x}Mo_x$ alloy within the practice of the invention will have x ranging from 0.001 to 0.1. Excellent results have been obtained when x is 0.066

Exemplary uses include lowering the cost of hydrogen production in alkaline media by employing low-cost and earth-abundant electrocatalyst while maintaining the higher activity and durability similar to current commercially available and expensive PGM metals. Pt deposited on graphitized carbon (Pt/C, 20 wt. %) is the standard for electrode material use in commercial hydrogen production devices. The catalyst also has use in the petroleum industry. Petroleum refining involves catalytic transformation of crude oil feedstocks into useful petrochemical products. This process typically include hydrogenation to enhance the stability of fuel and hydrotreatment to lower the sulfur and nitrogen content, which can generate poisonous impurities for platinum and palladium catalysts used in refineries and vehicle exhaust systems, as well as contribute to sulfur ($SO_x$) and nitrogen oxide ($NO_x$) emissions. Crude oil feedstocks often contain high levels of organosulfur and nitrogen most commonly as aromatic thiophenes and quinolines, which are very difficult to reduce. Deep hydrodesulfurization (reducing S content to <10 ppm) of sterically-hindered organosulfur species without a concomitant increase in $H_2$ pressure is necessary to meet the increasingly stringent requirements for heteroatom content in petrochemicals. Current commercial catalyst, the sulfided molybdenum ($MoS_2$) supported on alumina, is not very active for hydrotreatment, because of its sulfide surface termination and hindrance of surface Mo sites. The disclosed Ni—Mo alloy nanocrystals may provide better performance than commercial catalysts ($MoS_2$).

REFERENCES

1. McCrory, C. C. L.; Jung, S.; Ferrer, I. M.; Chatman, S. M.; Peters, J. C.; Jaramillo, T. F. Benchmarking Hydrogen Evolving Reaction and Oxygen Evolving Reaction Electrocatalysts for Solar Water Splitting Devices. *J. Am. Chem. Soc.* 2015, 137, 4347-4357. doi.org/10.1021/ja510442p
2. McKone, J. R.; Sadtler, B. F.; Werlang, C. A.; Lewis, N. S.; Gray, H. B.; J. R. McKone; B. F. Sadtler; C. A. Werlang; N. S. Lewis; H. B. Gray; et al. Ni—Mo Nanopowders for Efficient Electrochemical Hydrogen Evolution. *ACS Catal.* 2013, 3, 166-169. doi.org/10.1021/cs300691m
3. Metalary metalary.com (accessed Apr. 14, 2019).

EXAMPLE

Increasing energy demands and growing environmental concerns are causing concerns over the use of fossil fuels.[1,2] Material science solutions for current energy technologies are being heavily researched for our society to help transition into the large scale implementation of renewable energies.[3] Renewable hydrogen as an energy carrier and chemical reagent is a foreseeable energy supplement to fossil fuels. Promising methods to produce hydrogen include electrochemical water splitting utilizing renewable electricity or direct water splitting via photocatalysis, both of which will require inexpensive high-performance electrocatalysts.[4]

Current state-of-the-art electrocatalysts and photocatalysts for water splitting reactions typically incorporate platinum group metals (PGMs) as the primary or secondary catalyst(s) for the hydrogen evolution reactions (HER). The single-element cathodic earth-abundant electrocatalysts, such as Ni, Mo, Co, W, and Fe, typically exhibit high over-potentials (>150 mV) and low stability (<48 h) compared to PGM catalysts (~70 mV and >100 h, respectively).[5,6] To improve HER performance, synergistic effects of alloying earth-abundant metals are being studied.[3,7-10] Specifically, the binding energies of binary alloys can be tuned by manipulating the atomic ratio to achieve an optimal electrocatalyst surface affinity for the reactants and products. The correlation of exchange current densities to metal-hydrogen bond strengths for electrocatalysts (volcano plots) indicate a goldilocks region for the surface affinity of electrocatalysts.[3,9,11,12] To further aid with the HER, the growth of nanostructured catalysts has been utilized to produce high surface area, high energy faceted crystals, and unique crystal phases that are typically inaccessible as bulk materials.[3,13] Both Ni and Mo are earth-abundant and significantly less expensive than PGMs (Pt, Mo, and Ni are about $29,000/kg, $26/kg, and $9/kg, respectively).[14] However, prior reports on $Ni_{1-x}Mo_x$ alloys rarely referenced the crystal phases and to complicate this further, stoichiometric quantities are often described instead of true crystal phases.[15,16] For instance, the stoichiometric ratios reported for $Ni_{1-x}Mo_x$ alloys have been ascribed to mixtures of Ni, Mo, $Ni_4Mo$, and $Ni_3Mo$ alloys and/or amorphous materials.[5,7,15,17,18] Thus, a systematic study on crystal structure or phase-dependent HER activity of $Ni_{1-x}Mo_x$ alloys has not been properly elucidated.

Electrocatalytic water splitting can be carried out in both acidic and alkaline media.[2,6,10,11,16,19,20] Acidic media are compatible with proton exchange membranes developed by the fuel cell industry and usually provide a higher energy conversion efficiency.[3-5,19-24] The differences in half reaction mechanisms and charge carrier mobilities at both electrode interfaces, in acidic and alkaline media, suggest higher HER activity under acidic conditions.[21] Recent studies contradict this trend and show high HER performance in alkaline medium.[6,25-28] For instance, an over-potential of 30 mV was observed for an electrodeposited Ni—Mo film in 1 M NaOH at -10 mA/cm².[6] Furthermore, transition metal-based catalysts are thought more stable in alkaline media, owing to an alternate hydrogen formation mechanism and bulkier $OH^-$ ion diffusion.[21] Non-PGM transition metal electrocatalysts, including Ni, Mo, and Cu, have a noted low stability in acidic media.[5] For example, the over-potential of an electrodeposited Ni—Mo film in an acidic medium increased by ~50 mV after 20 h of constant polarization, and when the potential was cycled from -0.3 to 0.9 V vs. RHE, a full degradation and dissolution was observed after 2000 cycles.[5,6,15] Therefore, alkaline medium can provide the benefits of added stability and plausible high performance for $Ni_{1-x}Mo_x$ NPs as HER catalysts. However, a systematic study on the HER activity of distinct crystal phases and atomic compositions of $Ni_{1-x}Mo_x$ alloy NPs has yet to be elucidated.

Herein, a colloidal synthesis method was developed to produce phase-pure cubic and hexagonal $Ni_{1-x}Mo_x$ alloy NPs with varying compositions of Mo (x=0-11.4%) for alkaline HER. The crystal structures and compositions of the $Ni_{1-x}Mo_x$ alloy NPs were tuned by varying the reaction temperature, heating rate, and concentration of the precursors and octadecene (ODE) and oleylamine (OLA) surfactants and solvents. It was found that the cubic alloys show higher catalytic activity for HER when compared to the hexagonal alloys. In general, HER activity increases with increasing Mo content up to 6.6% for the cubic alloys, followed by a decrease at 8.7% and 11.4%. The cubic $Ni_{0.934}Mo_{0.066}$ alloy NPs displayed the highest activity as alkaline HER electrocatalysts, rivalling commercial PGM catalysts. This work further describes variations in the surface species of the electrocatalysts to provide a fundamental understanding of what material physical properties (e.g. crystal structure, composition, morphology, and surface states) lend to modification of the HER performance.

EXPERIMENTAL SECTION

Materials. Nickel acetylacetonate ($Ni(acac)_2$), molybdenum hexacarbonyl ($Mo(CO)_6$), Octadecene (ODE;

90%) and KOH (reagent grade, 90%) were purchased from Acros Organics. Oleylamine (OLA primary amine, 70%), Pt on graphitized carbon (Pt/C, 20 wt. %), and Ti foil (thickness 0.25 mm, 99.7%) were purchased from Sigma-Aldrich. Graphite rods (6.15 mm×102 mm, 99.9995%) were purchased from Alfa Aesar. Isopropyl alcohol (certified ACS Plus) was purchased from Fisher Scientific. PELCO colloidal Ag paint was purchased from Ted Pella Inc. Henkel Loctite Hysol 9462 epoxy adhesive was purchased from Ellsworth Adhesives. PTFE insulated stranded Ag-plated Cu wire (Chemical-Resistant Wire) was purchased from McMaster-Carr. A Pt (2 mm disc) working electrode and a Hg/HgO reference electrode filled with 1 M NaOH solution were purchased from CH Instruments. OLA and ODE were dried at 120° C. under vacuum for 3 h prior to use. Methanol and toluene were dried over molecular sieves and Na metal, respectively, and distilled under $N_2$ prior to use. All other chemicals were used as received.

Synthesis of Cubic $Ni_{1-x}Mo_x$ Alloy NPs. In a typical synthesis of cubic $Ni_{1-x}Mo_x$ alloy NPs, appropriate amounts of a nickel organic compound (e.g. $Ni(acac)_2$) and a molybdenum organic compound (e.g., $Mo(CO)_6$) were mixed in a 50 mL flask with a surfactant (e.g., 10 mL OLA surfactant) in an inert atmosphere (e.g., inside a nitrogen glove box). This mixture was sealed under argon, attached to a Schlenk line, and degassed at 120° C. for 60 min to produce a homogeneous green color solution. Then, the reaction mixture was flushed with argon, and the temperature was raised to 230-250C (at a rate of ~5° C. per min) and heated for additional 30 min to produce a black color solution of phase-pure, cubic $Ni_{1-x}Mo_x$ alloy NPs. Alloy NPs with varying elemental compositions were synthesized by varying the molar ratios of $Ni(acac)_2$: $(Mo(CO)_6)$ as illustrated in Table 1. Phase-pure cubic Ni NPs were produced at 230° C. with no use of $Mo(CO)_6$.

Synthesis of Hexagonal $Ni_{1-x}Mo_x$ Alloy NPs. In a typical synthesis of hexagonal $Ni_{1-x}Mo_x$ alloy NPs (e.g., x ranging from 0.001 to 0.1), appropriate amounts of a nickel organic compound (e.g. $Ni(acac)_2$) and molybdenum organic compound (e.g., $Mo(CO)_6$) were mixed with a surfactant mixture (e.g., 1 mL of OLA and 7 mL of ODE) in a 50 mL round bottom flask under nitrogen. This mixture was sealed under argon, attached to a Schlenk line, and degassed at 120° C. for 60 min to produce a homogeneous green color solution. Then, the mixture was flushed with argon, and the temperature was raised to 300° C. (at a rate of ~8° C. per min) and heated for 30 min to produce hexagonal $Ni_{1-x}Mo_x$ nanoalloys. The elemental compositions of the hexagonal alloy NPs were varied by changing the molar ratios of $Ni(acac)_2$:$(Mo(CO)_6)$ as shown in Table 1. Phase-pure hexagonal Ni NPs were produced at 300° C. with no use of $Mo(CO)_6$.

TABLE 1

Moles of $Ni(acac)_2$ and $Mo(CO)_6$, volumes of OLA and ODE surfactant and solvents, and growth temperatures used in the synthesis of $Ni_{1-x}Mo_x$ alloy NPs with varying atomic composition and crystal structures.

| Sample Name[a] | Crystal Structure | $Ni(acac)_2$ (mmol) | $Mo(CO)_6$ (mmol) | OLA (mL) | ODE (mL) | Growth Temperature (° C.) |
|---|---|---|---|---|---|---|
| Ni | Cubic | 0.500 | 0.000 | 10 | 0 | 230 |
| $Ni_{0.913}Mo_{0.087}$ | Cubic | 0.400 | 0.100 | 10 | 0 | 230 |
| $Ni_{0.934}Mo_{0.066}$ | Cubic | 0.375 | 0.125 | 10 | 0 | 230 |
| $Ni_{0.886}Mo_{0.114}$ | Cubic | 0.350 | 0.015 | 10 | 0 | 230 |
| $Ni_{0.989}Mo_{0.011}$ | Cubic | 0.450 | 0.050 | 10 | 0 | 250 |
| $Ni_{0.964}Mo_{0.036}$ | Cubic | 0.400 | 0.100 | 10 | 0 | 250 |
| $Ni_{0.982}Mo_{0.018}$ | Cubic | 0.350 | 0.150 | 10 | 0 | 250 |
| Ni | Hexagonal | 0.500 | 0.000 | 1 | 7 | 300 |
| $Ni_{0.990}Mo_{0.010}$ | Hexagonal | 0.450 | 0.050 | 1 | 7 | 300 |
| $Ni_{0.980}Mo_{0.020}$ | Hexagonal | 0.400 | 0.100 | 1 | 7 | 300 |
| $Ni_{0.985}Mo_{0.015}$ | Hexagonal | 0.375 | 0.125 | 1 | 7 | 300 |

[a]Elemental compositions of Ni and Mo were investigated by SEM-EDS analysis of multiple individually prepared samples and average values are presented.

Isolation and Purification of NPs. After synthesis, the reaction mixture was promptly cooled using compressed air until the temperature reached ~80° C. The mixture was transferred into a centrifuge tube and ~5 mL of toluene was added, followed by ~20 mL methanol. The mixture was centrifuged at 4000 g for 5 min to collect a black color precipitate of alloy NPs. The alloy NPs were purified by redispersion and precipitation (3-5 times) in toluene and methanol, respectively.

Physical Characterization. Powder X-ray diffraction (PXRD) patterns of alloy NPs were recorded using a PANanalytical X'pert PRO equipped with Cu Kα (λ=1.5418 Å) radiation and calibrated with a Si standard. Transmission electron microscopy (TEM) images were acquired using a Zeiss Libra 120 TEM microscope equipped with a Gatan ultrascan 4000 camera operating at 120 kV. High-resolution TEM images were recorded on a FEI Model Titan 8300 electron microscope equipped with a Gatan Model 794 multiscan camera operating at 300 kV. Samples were prepared by drop casting 10 μL of alloy NPs dispersed in toluene onto carbon-coated Cu grids, followed by solvent evaporation. A Thermofisher ESCALAB 250 instrument equipped with Al Kα radiation was utilized to record X-ray photoelectron spectra (XPS) of alloy NPs. The powder samples were drop-casted onto Ti foils and annealed in 5% $H_2$/95% Ar gas mixture at 450° C. for 2 h prior to XPS. High-resolution spectra were collected with a pass energy of 26.00 eV, 20 ms per step, and multiple sweeps depending on the counts observed for the Mo3d and Ni2p regimes. Energy dispersive spectra (EDS) were recorded using a Hitachi Model FE-SEM Su-70 scanning electron microscope (SEM) operating at 20 keV with an in-situ EDAX detector. The samples were adhered onto an Al stub using double-sided carbon tape purchased from Ted Pella Inc. The atomic percentages of Ni and Mo were obtained from the EDS analysis of multiple individually prepared samples, and the averaged values were obtained from 5 individual measurements for each sample. The composition of the alloys were also investigated by a Varian VISTA-MPX inductively coupled plasma-optical emission spectrometer (ICP-OES). The samples were digested in acids (HCl:HNO$_3$=3:1) for ICP-OES, which were further diluted with milli-Q filtered water prior to analysis.

Fabrication of Working Electrodes. The HER electrodes were fabricated by drop-casting colloidal suspensions of $Ni_{1-x}Mo_x$ alloy NPs or commercial Pt/C catalyst dispersed in isopropyl alcohol onto Ti foil substrates. The Ti foils were cut into square pieces (~0.2 cm$^2$), pressed flat, and sonicated in 1 M HCl and 40% H$_2$O$_2$ (1:1, v:v) solution for 15 min. A mixture of acetone and ethanol (1:1, v:v) was then used to clean the Ti foils via sonication for 10 min, followed by additional 10 min sonication in Milli-Q water (18Ω). The $Ni_{1-x}Mo_x$ and Pt/C catalyst inks were produced by weighing appropriate amounts of alloy NPs or Pt/C and suspending in isopropyl alcohol (10 mg/mL) via sonication for 30 min. Then, 10 µL aliquots of catalyst inks were drop-casted onto the clean Ti foil substrates, incrementally to produce a visible coating (~100 µL total). Each aliquot was allowed to dry in air prior to subsequent addition. The electrocatalyst-coated Ti foils were then annealed at 450° C. for 2 h in 5% H$_2$/Ar. The working electrodes were prepared by connecting the annealed substrate to an insulated Cu wire. Enough insulation was stripped to allow for an ohmic contact. Ag paint was then utilized to connect the back of the Ti substrate to the bare Cu wire. Finally, a two-part epoxy was applied to insulate the electrode, leaving the electrocatalytic active area on the front of the Ti substrate exposed. The epoxy was allowed to dry for ~5 h before use.

Electrochemical Measurements. The performance of $Ni_{1-x}Mo_x$ alloy NPs for HER was investigated by linear sweep voltammetry (LSV) using a Gamry Interface 5000P galvanostat. All electrochemical measurements were conducted in a conventional three-electrode cell at room temperature with an alkaline electrolyte solution (2 M KOH) prepared from Milli-Q-filtered water. The electrolyte was purged with high purity N$_2$ prior to and during data acquisition. The $Ni_{1-x}Mo_x$ alloy NP coated Ti foil electrodes and an over-dipped graphite rod were used as the working and counter electrodes, respectively. The potentials of the working electrodes were recorded against an Alkaline/HgO (1 M NaOH) reference electrode. The polarization data were obtained for each electrocatalyst by sweeping the potential from −0.798 to −1.398 V vs Hg/HgO at a sweep rate of 5 mV s$^{-1}$ under rapid stirring. The built-in resistance correction via a current interruption method was utilized on the Gamry Interface 5000P to obtain the polarization data. Chronopotentiometry was used to investigate the stability of $Ni_{1-x}Mo_x$ alloy NP electrodes. The voltage was recorded over time at a constant current density of −20 mA/cm$^2$, agitation (300 rpm), and nitrogen bubbling.

RESULTS AND DISCUSSION

Synthesis of $Ni_{1-x}Mo_x$ Alloy NPs $Ni_{1-x}Mo_x$ alloy NPs with cubic and hexagonal structures and distinct elemental compositions were produced by thermal decomposition of Ni(acac)$_2$ and Mo(CO)$_6$ in alkylamine (OLA) and alkene (ODE) surfactant/solvent mixtures at 230-300° C. The growth of different crystal phases is governed by the concentration of OLA/ODE ligands, heating rate, and reaction temperature. In our experiments, phase-pure cubic alloy NPs were produced when OLA is used as both the surfactant and solvent with no use of ODE at 230-250° C., whereas phase-pure hexagonal alloys were obtained in ODE with minimal amount of OLA at 300° C. It is assumed that at high concentration of OLA, the large excess of alkylamines passivate the alloy nuclei surface, slowing down the growth, and producing thermodynamically stable cubic $Ni_{1-x}Mo_x$ alloys.[29] Upon introduction of ODE (>35-60% of total volume), $Ni_{1-x}Mo_x$ alloy NPs consisting of both cubic and hexagonal phases were produced. The decreased concentration of OLA reduces the amount of alkylamines that passivate the alloy nuclei surface, promoting the growth of mixed phase alloys.[30] In contrast, phase-pure hexagonal alloy NPs were produced in reactions performed with large excess of alkenes (ODE, 70-80% of the total volume). It is likely that high reaction temperature and significantly low concentrations of OLA facilitate the rapid decomposition of Ni/Mo precursors into hexagonal nuclei and subsequent growth of hexagonal alloys.[28] It should be noted that high temperature (≥300° C.) along with rapid growth of alloy nuclei are essential for the synthesis of phase-pure hexagonal $Ni_{1-x}Mo_x$ alloys, whereas the use of OLA only at 300° C. resulted in mix-phased alloys.

It is important to note that the concentration of Ni and Mo precursors and growth time have no effect on the resultant crystal structure, but rather affect the composition and size-dispersity of $Ni_{1-x}Mo_x$ alloys. In general, lower temperature and higher Mo concentrations resulted in larger, polydispersed alloy NPs whereas higher temperature and lower Mo concentrations consistently produced smaller, more uniform alloy NPs. The atomic composition of the alloy is also dependent on the reaction temperature. At low temperature (230° C.), more Mo (up to 11.4%) can be incorporated into cubic Ni crystals whereas at high temperature (250-300° C.) significantly low Mo (~1-3.6%) is incorporated into both cubic and hexagonal Ni crystals. In addition, Mo(CO)$_6$ exhibits a lower reactivity than Ni(acac)$_2$, therefore alloy NPs show low Mo incorporation into both crystal phases.[31] However, by manipulating the growth temperature and the concentration of alkyl and alkylamine ligands, phase-pure hexagonal and cubic $Ni_{1-x}Mo_x$ alloy NPs, displaying low Mo concentrations (i.e. x=~1-11.4%), can be reproducibly produced.

PXRD patterns of $Ni_{1-x}Mo_x$ alloys produced at 230-250° C. suggest that they retain the face centered cubic (fcc) structure of Ni and a shift in diffraction patterns to lower 2θ angles with increasing Mo (x=0.011-0.066), consistent with the expansion of fcc Ni by larger Mo.[18] The diffraction patterns of cubic alloys show three characteristic Bragg reflections, which can be indexed to (111), (200), and (220) planes of cubic Ni—Mo (FIG. 1A). In contrast, the diffraction patterns of $Ni_{1-x}Mo_x$ alloys produced at 300° C. show the hexagonal crystal structure, with eight pronounced reflections originating from (010), (002), (011), (012), (110), (103), (112), and (201) planes. A systematic shift in diffraction patterns to lower 2θ angles with increasing concentration of the Mo is also evident in the hexagonal alloys, specifically for x=0.012 and 0.015 compositions. However, cubic $Ni_{0.913}Mo_{0.087}$ and hexagonal $Ni_{0.0981}Mo_{0.020}$ alloy NPs do not follow this trend likely because of minor hexagonal and cubic impurities present in those samples, respectively. The elemental compositions of cubic and hexagonal alloys, obtained from SEM/EDS analysis, indicate Ni:Mo atomic ratio of 98.93-88.6%:1.07-11.40% (Table 2). The composition analysis via ICP-OES showed a similar trend in the Mo concentration, in agreement with EDS. However, a larger difference between the nominal molar ratio and experimental ratio of Ni:Mo was noted, which we attribute to limited solubility of Mo atoms in both cubic and hexagonal Ni crystals.

Figure 2:
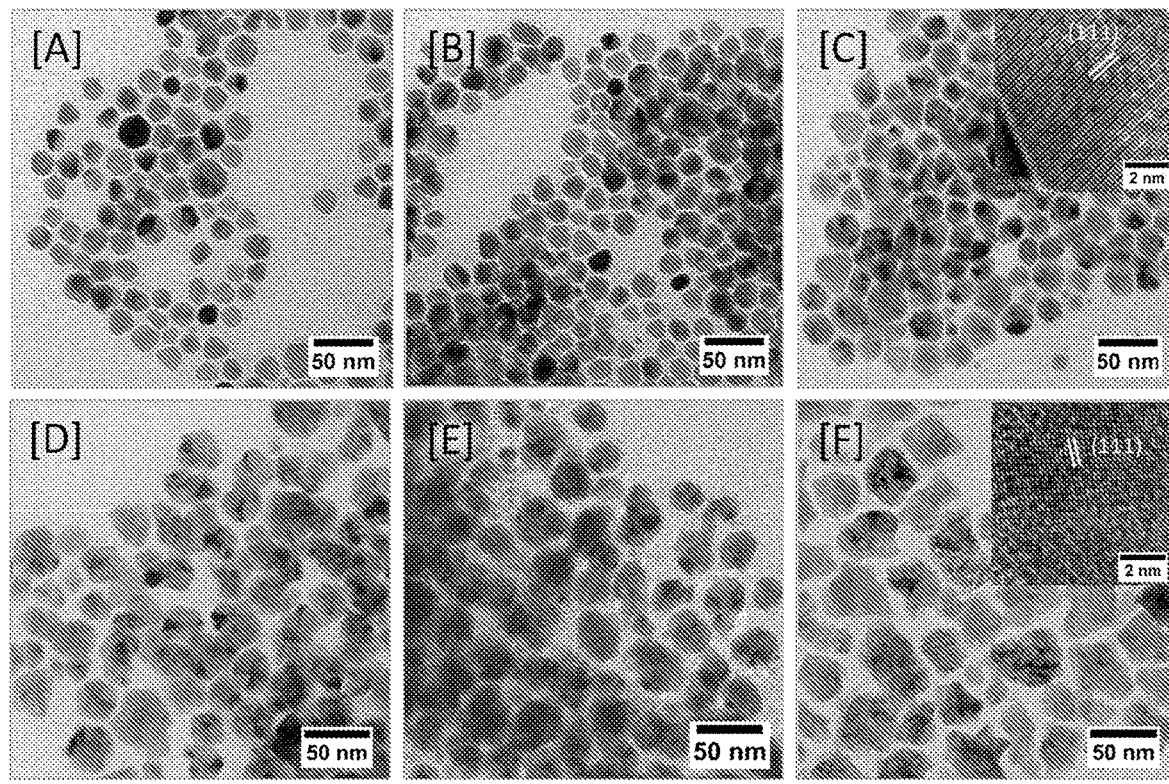
FIG. 2 present multiple panels of low resolution TEM images of cubic $Ni_{1-x}Mo_x$ alloy NPs with varying elemental composition: [A] x=0.011 (18.4±2.9 nm), [B] x=0.018 (24.9±5.4 nm), [C] x=0.036 (22.1±4.5 nm), [D] x=0.066 (29.9±4.8 nm), [E] x=0.087 (28.9±5.4 nm) and [F] x=0.114 (42.9±6.8 nm). Insets in (C) and (D) show high resolution images of single particles with lattice fringes of 2.060 and 2.093 Å, corresponding to an expanded (111) plane of cubic Ni.

The morphology and size dispersity of alloy NPs were investigated by using TEM. FIG. 2 shows the representative TEM images recorded from as-synthesized $Ni_{1-x}Mo_x$ NPs with no further size selection. The cubic $Ni_{1-x}Mo_x$ alloys show pseudo-spherical to oblong-shaped particles with average sizes from 18.4±2.9-42.8±6.7 nm for x=0.011-0.114 compositions (FIG. 2, panels A-F). Corresponding size histograms showed notable variation in size across variable Mo compositions and high resolution TEM images showed high crystallinity of the alloy NPs. In general, a noteworthy increase in size with increasing concentration of Mo is observed because of the anisotropic growth of alloy NPs. The cubic $Ni_{0.934}Mo_{0.066}$, $Ni_{0.913}Mo_{0.087}$, and $Ni_{0.886}Mo_{0.114}$ NPs show pointy rough surfaces that are potentially attractive for electrocatalysis. However, the growth of an amorphous surface coating was also noted specifically for $Ni_{0.913}Mo_{0.087}$ and $Ni_{0.886}Mo_{0.114}$ alloy NPs. In contrast, the hexagonal NPs showed pseudo-spherical to polyhedral particles with average sizes of 23.5±5.3-23.4±3.7 nm for x=0.012-0.019 compositions. Similarly, phase-pure cubic and hexagonal Ni NPs produced via a similar synthesis showed spherical to polygonal particles. Both hexagonal $Ni_{1-x}Mo_x$ alloys and phase-pure cubic and hexagonal Ni crystals do not show rough surfaces, which has been commonly observed in cubic $Ni_{1-x}Mo_x$ alloys with high Mo (x=0.066-0.114). Thus, we assume that anisotropic alloy NPs with rough surface is induced by high concentration of Mo. It has been reported that primary amines allow for rapid reduction of Ni precursors at elevated temperatures but offer poor surface passivation, resulting in non-uniform growth of both cubic and hexagonal Ni crystals.[32] Thus, further optimization in synthetic parameters and the use of a combination of surfactant ligands and reducing agents (amine, phosphines, and/or alkyllithium) is necessary for the synthesis of monodisperse alloys. Since the focus of this study is on the investigation of electrocatalytic activity of $Ni_{1-x}Mo_x$ alloys, we minimized the use of strongly coordinating organic surfactants (alkyls and phosphines) to boost the overall HER performance.

Figure 3:
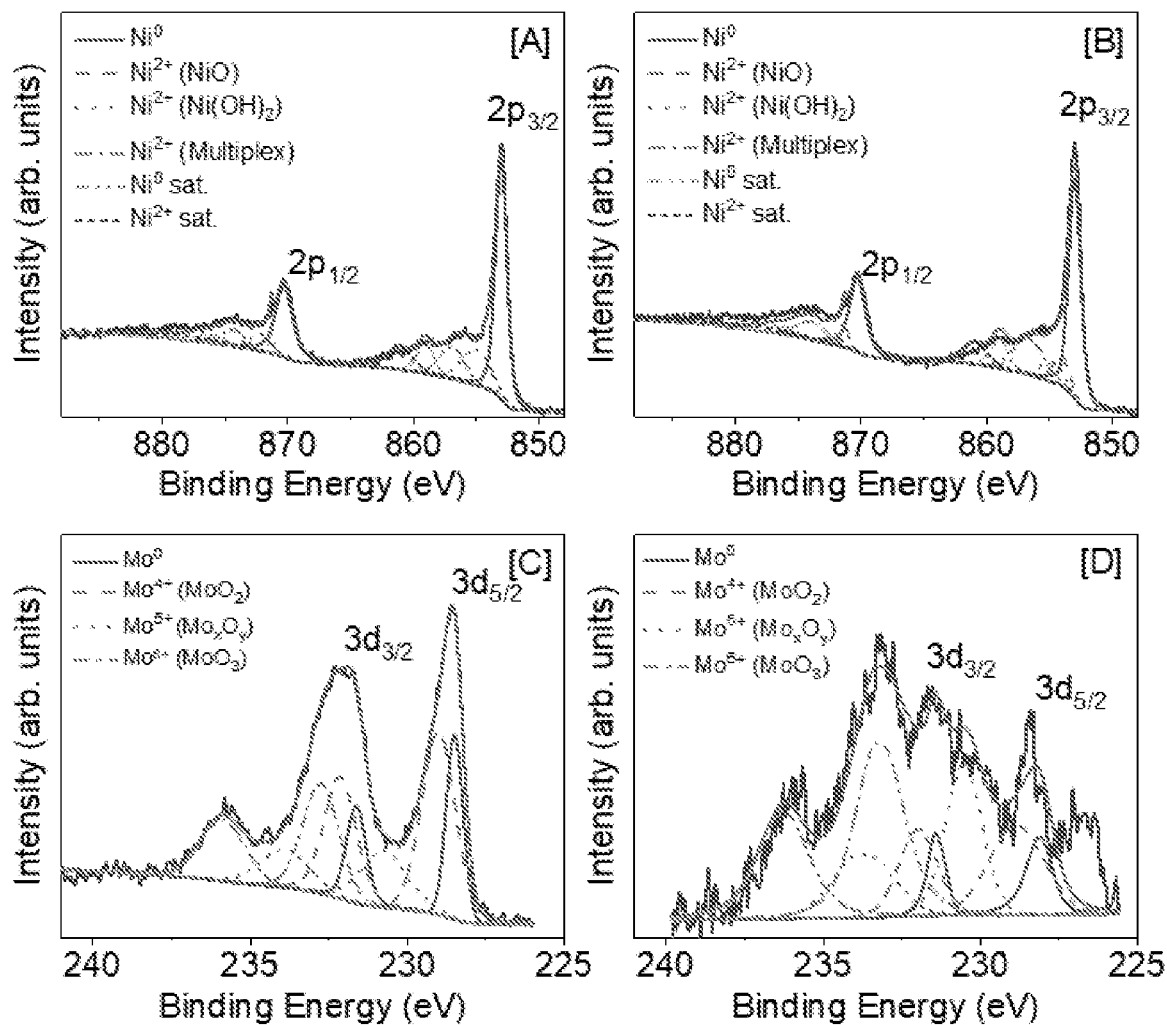
FIG. 3 Ni2p and Mo3d XPS spectra of [A,C] cubic $Ni_{0.913}Mo_{0.087}$ and [B,D] hexagonal $Ni_{0.988}Mo_{0.012}$ alloy NPs annealed at 450° C. for 2 h under 5% hydrogen/95% argon atmosphere. In all spectra, solid black lines are experimental data, colored lines are fitted deconvolutions with dash lines representing the doublets, and the solid red lines are spectral envelopes.

The surface of cubic $Ni_{0.913}Mo_{0.087}$ and hexagonal $Ni_{0.988}Mo_{0.012}$ alloy NPs (FIG. 3) was analyzed by XPS. The survey spectra of both samples showed peaks corresponding to Ni, Mo, C, and O. High-resolution XPS spectra were shifted on the basis of C1s and deconvoluted for the Ni2p and Mo3d orbitals. The binding energies of the deconvoluted $Ni2p_{3/2}$ spectra for the annealed cubic $Ni_{0.913}Mo_{0.087}$ NPs were observed at 852.7, 853.5, 855.8, 856.8, 858.1, and 861.3 eV, which correlate to $Ni^0$, $Ni_{2+}$ (NiO), $Ni^{2+}$ (Ni(OH)$_2$), $Ni^{2+}$ (Ni0/Ni(OH)$_2$ multiplex), $Ni^0$ ($Ni^0$+6 eV) and $Ni^{2+}$ satellites, respectively (FIGS. 3A-B).[15,18,20,33-36] The $Ni2p_{3/2}$ binding energies of the annealed hexagonal $Ni_{0.988}Mo_{0.012}$ NPs were negligibly shifted compared with the aforementioned states, suggesting presence of similar Ni species. Metallic $Ni^0$ was observed as the dominant species for each composition. The deconvoluted peaks in the $Mo3d_{5/2}$ region for the cubic $Ni_{0.913}Mo_{0.087}$ alloy NPs were observed at 228.3, 229.0, 230.5, and 232.6 eV, which correlate to $Mo^0$, $Mo^{4+}$ (MoO$_2$), $Mo^{5+}$ (Mo$_x$O$_y$), and $Mo^{6+}$ (MoO$_3$) species, respectively (FIGS. 3C-D).[15,18,20,33-35] Low counts were observed for the high-resolution Mo3d spectra of hexagonal $Ni_{0.988}Mo_{0.012}$ NPs, which agrees with the low levels of Mo present in the hexagonal NPs. Higher valent charged species were prominent in the Mo3d region over the Ni2p region for annealed samples. As-synthesized $Ni_{1-x}Mo_x$ alloy NPs were also analyzed by XPS and a clear change in surface species was noted after annealing. The pre-annealed $Ni_{1-x}Mo_x$ alloy NPs show $Ni_{2+}$ (Ni(OH)$_2$) and $Mo^{6+}$ (MoO$_3$) as dominant species for both crystal phases with low levels of metallic $Ni^0$ and $Mo^0$ present. These high valent Ni and Mo species are likely coordinated with residual surfactant ligands or can originate from potential oxide impurities introduced during synthesis and isolation of alloy NPs. Annealing reduces the surface charged states, removes the residual ligands, and increases the metallic $Ni^0$ and $Mo^0$ species. Similar spectra were recorded for as-synthesized and annealed alloy NPs with cubic and hexagonal crystal structures, supporting the production of $Ni_{1-x}Mo_x$ alloys.

Electrocatalytic Activity of $Ni_{1-x}Mo_x$ alloy NPs for HER

Titanium foil was utilized to fabricate $Ni_{1-x}Mo_x$ working electrodes for HER. As a current collector, Ti has good mechanical strength and electrical conductivity but lacks HER activity due to electrochemical inertness.[3,4,37] Prior to annealing in H$_2$/Ar atmosphere, the $Ni_{1-x}Mo_x$ alloy NPs were not electrocatalytic active. However, after annealing residual ligands were removed, charge transport was increased, resulting in HER activity. The TEM images, EDS spectra, and XRD patterns of as-synthesized and post-annealed samples show no significant change in morphology, composition, and crystal structures of the electrocatalysts.

The HER activity of $Ni_{1-x}Mo_x$ alloy NPs was investigated in alkaline media using linear sweep voltammetry (LSV). Polarization curves of plotted LSV data quantify the behavior of electrocatalysts over a range of current densities. The voltage at specific current densities are extracted from the polarization curves to provide over-potentials by subtracting the thermodynamic value for a specific chemical reaction (0 V vs. RHE for the HER). The standard current densities reported for renewable energy applications are -10 and -20 mA/cm$^2$, and provide a metric to compare the performance of various electrocatalysts.[13,38-41]

Figure 4:
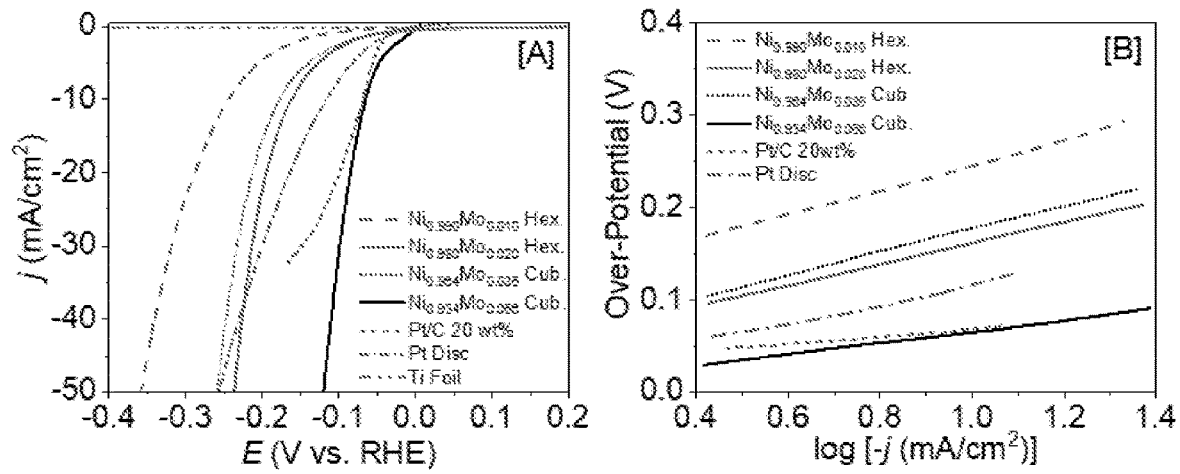
FIG. 4 [A] Polarization curves and [B] Tafel plots of Ti foil, commercial Pt disc and Pt/C electrocatalysts, and $Ni_{1-x}Mo_x$ alloy NP electrocatalysts for alkaline HER. Data were recorded at 25° C. under nitrogen atmosphere with continuous stirring.

HER polarization curves were generated for varying compositions and crystal structures of alloy NPs (FIG. 4). The HER activity of phase-pure cubic and hexagonal Ni NPs were also investigated as a benchmark for the performance investigation of $Ni_{1-x}Mo_x$ alloy NPs. The cubic and hexagonal Ni NPs exhibit over-potentials of -193 mV and -232 mV at -10 mA/cm$^2$, suggesting a higher HER activity for cubic sample. The activity of the cubic Ni NPs was further enhanced after incorporation of Mo for all cubic $Ni_{1-x}Mo_x$ alloy samples. The cubic $Ni_{0.934}Mo_{0.066}$ alloy NPs showed the lowest over-potential (highest HER activity) of -65 mV at -10 mA/cm$^2$ (Table 2). A similar composition of $Ni_{0.938}Mo_{0.062}$ showed high HER activity (-62 mV at -10 mA/cm$^2$) agreeing with the performance of $Ni_{0.934}Mo_{0.066}$. However, further increasing Mo results in a decrease in HER activity. The cubic $Ni_{0.913}Mo_{0.087}$ and $Ni_{0.886}Mo_{0.114}$ alloy NPs showed over-potentials of -132 and -253 mV at -10 mA/cm$^2$, respectively. This increase in over-potential for the $Ni_{0.913}Mo_{0.087}$ is likely attributed to significant amorphous coating observed on alloy NPs, which can hinder the catalytically active crystalline core (crystal facets) of the particles. In contrast, the hexagonal $Ni_{0.990}Mo_{0.010}$, $Ni_{0.985}Mo_{0.015}$, and $Ni_{0.980}Mo_{0.020}$ alloy NPs showed over-potentials of −242, −228, and −162 mV at −10 mA/cm², respectively. $Ni_{0.980}Mo_{0.020}$ alloy NPs were found to be the most HER active hexagonal sample. In general, the hexagonal alloy NPs show higher over-potentials (lower HER activity) compared to the cubic alloy NPs, consistent with phase dependency observed in monometallic Ni NPs. However, the highest HER active (i.e. the lowest over-potential) hexagonal ($Ni_{0.980}Mo_{0.020}$, −162 mV) alloy NPs outperformed the lowest HER active cubic ($Ni_{0.964}Mo_{0.036}$, −177 mV) NPs.

Figure 5:
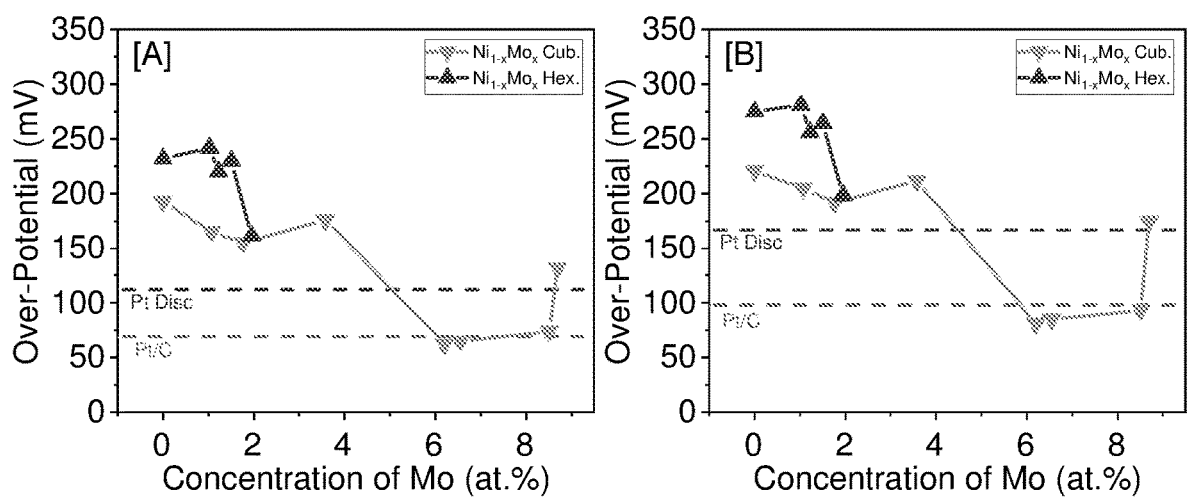
FIG. 5 are plots illustrating the effect of Mo content on the magnitude of the over-potential for $Ni_{1-x}Mo_x$ alloy NPs at current densities of [A] −10 and [B] −20 mA/cm². Two dashed lines represent the standard HER activity obtained for Pt-based electrodes under alkaline conditions.

Polarization behavior for $Ni_{1-x}Mo_x$ electrocatalysts was also compared with a commercial Pt disc and Pt/C electrodes (FIG. 4). For a baseline, Ti foil electrodes were also tested. A significant improvement in HER activity was observed over the Ti foil substrate for all NPs. The over-potentials of the two Pt-based electrodes agree well with literature reports and performed as expected.[5] For Pt disc, over-potentials of −129 mV and −167 mV were produced at −10 and −20 mA/cm², respectively. The Pt/C electrodes show over-potentials of −68 and −98 mV at −10 and −20 mA/cm², respectively. In contrast, the highest performing hexagonal ($Ni_{0.980}Mo_{0.020}$) and cubic ($Ni_{0.934}Mo_{0.066}$) alloy NPs show −162/−199 and −65/−85 mV over-potentials at −10/−20 mA/cm², respectively. The hexagonal $Ni_{1-x}Mo_x$ alloy NPs were not observed to rival platinum-based electrodes for HER activity. However, the cubic $Ni_{1-x}Mo_x$ alloys NPs show either comparable or improved HER activity to commercial Pt disc or Pt/C electrocatalysts. The dependence of HER activity on alloy composition was also investigated (FIG. 5). In general, an increase in the Mo content results in a decrease in the magnitude of the over-potential (increase in HER activity) for both crystal structures. The hexagonal alloys exhibit a sharp increase in HER activity compared to the cubic alloys (FIGS. 5A-B). The cubic $Ni_{0.934}Mo_{0.066}$ NPs show the highest HER performance, following by a decrease in HER activity for $Ni_{0.913}Mo_{0.087}$ and $Ni_{0.886}Mo_{0.114}$ alloy NPs. FIG. 5 shows the Pt disc and Pt/C over-potentials as horizontal dashed lines representing a standard electrocatalytic performance achieved for commercial PGMs. Among the $Ni_{1-x}Mo_x$ alloys investigated, $Ni_{0.934}Mo_{0.066}$ alloy NPs outperformed both Pt disc and Pt/C catalysts for alkaline HER, under identical experimental conditions.

TABLE 2

Comparative results of elemental compositions, over-potentials, and Tafel slopes obtained for Ni and $Ni_{1-x}Mo_x$ alloy NPs with cubic and hexagonal crystal phases.

| Sample Name[a] | Crystal Structure | Elemental Composition by ICP-OES (At %) | | Over-Potential (mV at −10 mA/cm²) | Over-Potential (mV at −20 mA/cm²) | Tafel slope (mV/dec) |
|---|---|---|---|---|---|---|
| | | Ni | Mo | | | |
| Ni | Cubic | 100 | 0 | −193 | −221 | 99.0 |
| $Ni_{0.913}Mo_{0.087}$ | Cubic | 90.43 | 9.57 | −132 | −175 | 112.3 |
| $Ni_{0.934}Mo_{0.066}$ | Cubic | 91.96 | 8.04 | −65 | −85 | 61.4 |
| $Ni_{0.886}Mo_{0.114}$ | Cubic | 82.9 | 17.1 | −253 | −292 | −131.6 |
| $Ni_{0.989}Mo_{0.011}$ | Cubic | 98.8 | 1.2 | −165 | −205 | 119.9 |
| $Ni_{0.964}Mo_{0.036}$ | Cubic | 96.9 | 3.1 | −177 | −212 | 129.4 |
| $Ni_{0.982}Mo_{0.018}$ | Cubic | 98.2 | 1.8 | −156 | −192 | 120.2 |
| Ni | Hexagonal | 100 | 0 | −232 | −275 | 152.0 |
| $Ni_{0.990}Mo_{0.010}$ | Hexagonal | 98.8 | 1.3 | −242 | −281 | 127.3 |
| $Ni_{0.980}Mo_{0.020}$ | Hexagonal | 97.9 | 2.1 | −162 | −199 | 113.9 |
| $Ni_{0.985}Mo_{0.015}$ | Hexagonal | 98.3 | 1.7 | −228 | −265 | 123.9 |

[a]Elemental compositions of Ni and Mo were investigated by SEM-EDS analysis of multiple individually prepared samples and average values are presented.

To obtain further insights into the electrochemical mechanism on the electrode surface, polarization data were converted into Tafel plots (FIG. 4B). The Pt/C electrode showed the best (lowest) Tafel slope of 39.6 mV/dec and the best performing cubic $Ni_{0.934}Mo_{0.066}$ alloy NPs showed a comparable slope of 61.4 mV/dec. Of interest, the Pt disc electrode showed an intermediate slope of 104.3 mV/dec. In contrast, the Tafel slopes of cubic $Ni_{1-x}Mo_x$ alloys (x=0-11.4%) were in the range of 61.4-129.4 mV/dec and hexagonal $Ni_{1-x}Mo_x$ alloy NPs (x=0-2.0%) were in the range of 113.9-152 mV/dec. These values suggest that Pt/C electrode exhibits a Heyrovsky HER mechanism whereas the cubic and hexagonal alloy NPs show Volmer-Heyrovsky HER mechanism.[4,42] In general, lower Tafel slopes represent better HER activity and the Pt/C electrode and cubic $Ni_{0.934}Mo_{0.066}$ alloy NPs showed the lowest Tafel slopes of 39.6 and 61.4 mV/dec. Overall, the Tafel slopes obtained for all $Ni_{1-x}Mo_x$ samples show a similar linear behavior and therefore the electrochemical reaction mechanism is expected to be similar.

Figure 6:
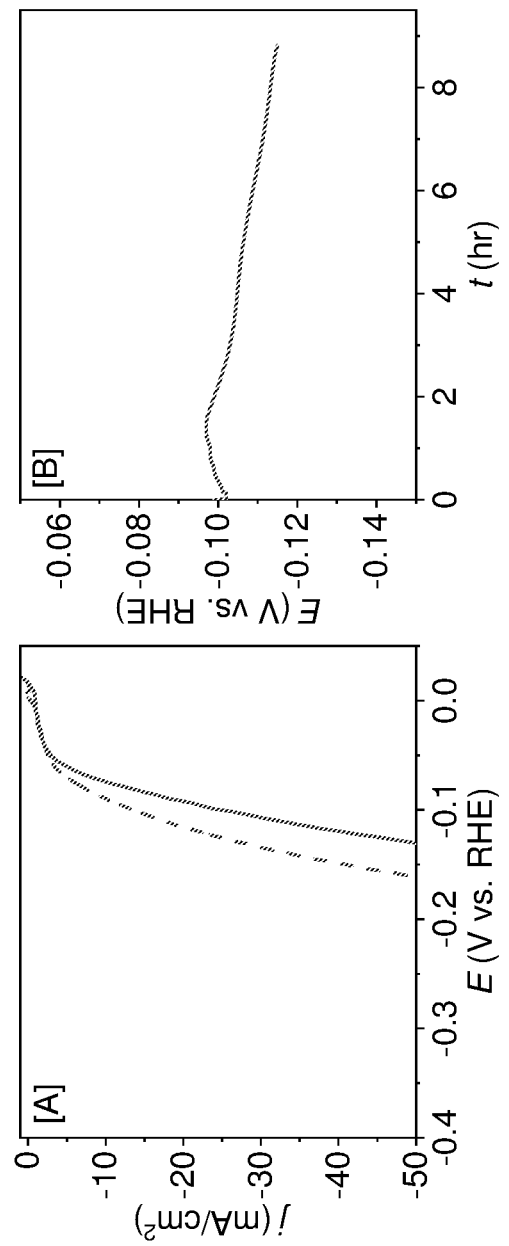
FIG. 6 are plots illustrating the stability of $Ni_{0.934}Mo_{0.066}$ alloy NPs for alkaline HER. [A] Polarization curve for before (solid line) and after (dashed line) 9 h of a constant polarization at a current density of −20 mA/cm². [B] The change in the over-potential over time.

Stability of the electrocatalyst is important for practical use in HER. In our work, due to the rapid production of hydrogen bubbles, the alloy NPs often exhibit a high delamination behavior. A constant current density was applied to cubic $Ni_{0.934}Mo_{0.066}$ alloy NPs and a change in the polarization curve was recorded up to 9 h (FIG. 6A). The over-potential at −10 mA/cm² of the cubic $Ni_{0.934}Mo_{0.066}$ alloy NPs increased from −71.2 to −84.3 mV after 9 h. The change in over-potential at −20 mA/cm² was also recorded and a decrease was observed from 0-1.6 h (FIG. 6B). This decrease has also been observed in other works and is likely due to an in-situ activation of the Ni—Mo electrocatalysts.[6] A consequential increase in over-potential was observed after 1.6 h, potentially due to physical deterioration of the working electrode. This loss is less significant than that reported for electrodeposited films of Ni—Mo in acidic media, where ~50 mV increase in over-potential was observed after 20 h.[5,6,15]

CONCLUSIONS

In summary, we have developed a facile colloidal synthesis to produce phase-pure $Ni_{1-x}Mo_x$ alloy NPs displaying cubic and hexagonal crystal structures and varying atomic compositions (0-11.4%), for the first time in the literature. The crystal structures of the alloy NPs were tuned by varying the growth temperature, growth rate, and concentration of the OLA/ODE ligands. As-synthesized alloy NPs exhibit spherical to polygonal morphology with sizes in the range of 18.4±2.9-42.8±6.7 nm across varying Mo compositions (~0-11.4%). A significant increase in shape anisotropy and growth of pointy rough surfaces were observed at high Mo concentrations (0.066-0.114%), specifically for cubic alloys. The XPS spectra of alloy NPs indicate the presence of $Ni^0$ and $Mo^0$ states in the core of NPs and charged $Ni^{n+}$ and $Mo^{n+}$ states on the surface of NPs, presumably stabilized by surfactant ligands. The HER activity of both Ni and $Ni_{1-x}Mo_x$ alloy NPs in alkaline medium is phase-dependent, with cubic alloys showing a significantly higher performance than the hexagonal alloys. For a current density of $-10$ mA/cm$^2$, cubic alloys showed over-potentials of $-62$ to $-177$ mV compared to $-162$ to $-242$ mV for hexagonal alloys. For cubic $Ni_{1-x}Mo_x$ alloy NPs, the HER activity increases with increasing Mo up to 6.6%, followed by a decrease in activity at 8.7% and 11.4%. In general, the admixture of Mo into cubic Ni NPs significantly increases the HER activity. Among all the tested materials, the cubic $Ni_{0.934}Mo_{0.066}$ NPs showed the best alkaline HER activity with over-potentials of $-64$ and $-85$ mV at $-10$ and $-20$ mA/cm$^2$, respectively, which are comparable or superior to commercial Pt-based electrodes.

Supporting information is available free of charge on the ACS Publications website. A schematic illustration of the electrode preparation method; elemental composition of annealed and unannealed $Ni_{1-x}Mo_x$ alloy NPs obtained from SEM/EDS and ICP-OES analyses; Low resolution and high resolution TEM images of cubic and hexagonal Ni and $Ni_{1-x}Mo_x$ alloy NPs including size histograms; FT-IR spectra of annealed and as-synthesized NPs; a survey XPS spectrum and Ni2p and Mo3d XPS spectra of annealed and as-prepared $Ni_{1-x}Mo_x$ alloy NPs; TEM images, PXRD patterns and EDS spectra of annealed $Ni_{1-x}Mo_x$ alloy NPs, and polarization curves plotted with respect to the Hg/HgO (1 M NaOH) reference electrode for Ti foil, Pt disc, Pt/C, and cubic and hexagonal $Ni_{1-x}Mo_x$ alloy NPs with varying Mo compositions.

Where a range of values is provided, it is understood that each intervening value, to the tenth of the unit of the lower limit unless the context clearly dictates otherwise, between the upper and lower limit of that range and any other stated or intervening value in that stated range, is encompassed within the invention. The upper and lower limits of these smaller ranges may independently be included in the smaller ranges and are also encompassed within the invention, subject to any specifically excluded limit in the stated range. Where the stated range includes one or both of the limits, ranges excluding either or both of those included limits are also included in the invention.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, representative illustrative methods and materials are now described.

All publications and patents cited in this specification are herein incorporated by reference as if each individual publication or patent were specifically and individually indicated to be incorporated by reference and are incorporated herein by reference to disclose and describe the methods and/or materials in connection with which the publications are cited. The citation of any publication is for its disclosure prior to the filing date and should not be construed as an admission that the present invention is not entitled to antedate such publication by virtue of prior invention. Further, the dates of publication provided may be different from the actual publication dates which may need to be independently confirmed.

It is noted that, as used herein and in the appended claims, the singular forms "a", "an", and "the" include plural referents unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation.

As will be apparent to those of skill in the art upon reading this disclosure, each of the individual embodiments described and illustrated herein has discrete components and features which may be readily separated from or combined with the features of any of the other several embodiments without departing from the scope or spirit of the present invention. Any recited method can be carried out in the order of events recited or in any other order which is logically possible.

REFERENCES (1) Gür, T. M. Perspective—Low-Carbon Electricity Is Great: What about "Less-Carbon"? *J. Electrochem. Soc.* 2017, 164, F1587-F1590.

(2) Laursen, A. B.; Patraju, K. R.; Whitaker, M. J.; Retuerto, M.; Sarkar, T.; Yao, N.; Ramanujachary, K. V.; Greenblatt, M.; Dismukes, G. C. Nanocrystalline $Ni_5P_4$: A Hydrogen Evolution Electrocatalyst of Exceptional Efficiency in Both Alkaline and Acidic Media. *Energy Environ. Sci.* 2015, 8, 1027-1034.

(3) Callejas, J. F.; Read, C. G.; Roske, C. W.; Lewis, N. S.; Schaak, R. E. Synthesis, Characterization, and Properties of Metal Phosphide Catalysts for the Hydrogen-Evolution Reaction. *Chem. Mater.* 2016, 28, 6017-6044.

(4) McKay, I. S.; Schwalbe, J. A.; Goodman, E. D.; Willis, J. J.; Majumdar, A.; Cargnello, M. Elucidating the Synergistic Mechanism of Nickel-Molybdenum Electrocatalysts for the Hydrogen Evolution Reaction. *MRS Commun.* 2016, 6, 241-246.

(5) McCrory, C. C. L.; Jung, S.; Ferrer, I. M.; Chatman, S. M.; Peters, J. C.; Jaramillo, T. F. Benchmarking Hydrogen Evolving Reaction and Oxygen Evolving Reaction Electrocatalysts for Solar Water Splitting Devices. *J. Am. Chem. Soc.* 2015, 137, 4347-4357.

(6) McKone, J. R.; Sadtler, B. F.; Werlang, C. A.; Lewis, N. S.; Gray, H. B.; J. R. McKone; B. F. Sadtler; C. A. Werlang; N. S. Lewis; H. B. Gray; et al. Ni—Mo Nanopowders for Efficient Electrochemical Hydrogen Evolution. *ACS Catal.* 2013, 3, 166-169.

(7) Patil, R. B.; Mantri, A.; House, S. D.; Yang, J. C.; McKone, J. R. Enhancing the Performance of Ni—Mo Alkaline Hydrogen Evolution Electrocatalysts with Carbon Supports. *ACS Appl. Energy Mater.* 2019, 2,2524-2533.

(8) Nahar, L.; Farghaly, A. A.; Esteves, R. J. A.; Arachchige, I. U. Shape Controlled Synthesis of Au/Ag/Pd Nanoalloys and Their Oxidation-Induced Self-Assembly into Electrocatalytically Active Aerogel Monoliths. *Chem. Mater.* 2017, 29, 7704-7715.

(9) Jelena M., J.; Nikola M., R.; Nedeljko V., K.; Milan M., J. Electrocatalysis for Hydrogen Electrode Reactions in the Light of Fermi Dynamics and Structural Bonding Factors—I. Individual Electrocatalytic Properties of Transition Metals. *Int. J. Hydrogen Energy* 1998, 23, 1121-1156.

(10) Yu, F.; Yu, L.; Mishra, I. K.; Yu, Y.; Ren, Z. F.; Zhou, H. Q. Recent Developments in Earth-Abundant and Non-Noble Electrocatalysts for Water Electrolysis. *Mater. Today Phys.* 2018, 7, 121-138.

(11) Laursen, A. B.; Wexler, R. B.; Whitaker, M. J.; Izett, E. J.; Calvinho, K. U. D.; Hwang, S.; Rucker, R.; Wang, H.; Li, J.; Garfunkel, E.; et al. Climbing the Volcano of Electrocatalytic Activity While Avoiding Catalyst Corrosion: $Ni_3P$, a Hydrogen Evolution Electrocatalyst Stable in Both Acid and Alkali. *ACS Catal.* 2018, 8, 4408-4419.

(12) Hellstern, T. R.; Kibsgaard, J.; Tsai, C.; Palm, D. W.; King, L. A.; Abild-Pedersen, F.; Jaramillo, T. F. Investigating Catalyst-Support Interactions to Improve the Hydrogen Evolution Reaction Activity of Thiomolybdate $[Mo_3S_{13}]_2-$ Nanoclusters. *ACS Catal.* 2017, 7, 7126-7130.

(13) McKone, J. R.; Sadtler, B. F.; Werlang, C. A.; Lewis, N. S.; Gray, H. B. Ni—Mo Nanopowders for Efficient Electrochemical Hydrogen Evolution. *ACS Catal.* 2013, 3, 166-169.

(14) Metalary https://www.metalary.com (accessed Apr. 14, 2019).

(15) Schalenbach, M.; Speck, F. D.; Ledendecker, M.; Kasian, O.; Goehl, D.; Mingers, A. M.; Breitbach, B.; Springer, H.; Cherevko, S.; Mayrhofer, K. J. J. Nickel-Molybdenum Alloy Catalysts for the Hydrogen Evolution Reaction: Activity and Stability Revised. *Electrochim. Acta* 2018, 259, 1154-1161.

(16) Wang, T.; Guo, Y.; Zhou, Z.; Chang, X.; Zheng, J.; Li, X. Ni—Mo Nanocatalysts on N-Doped Graphite Nanotubes for Highly Efficient Electrochemical Hydrogen Evolution in Acid. *ACS Nano* 2016, 10, 10397-10403.

(17) Zhang, J. G.; Zhang, S. M.; Li, S.; Dai, H.; Hu, Q.; Zhang, B.; Wang, L. M. Electrocatalytic Properties of Nickel Foam-Based Ni—Mo, Ni+Mo and Ni+Mo/Ni—Mo Electrodes for Hydrogen Evolution Reaction. *Mater. Sci. Forum* 2018, 921, 134-140.

(18) Zhang, T.; Liu, X.; Cui, X.; Chen, M.; Liu, S.; Geng, B. Colloidal Synthesis of Mo—Ni Alloy Nanoparticles as Bifunctional Electrocatalysts for Efficient Overall Water Splitting. *Adv. Mater. Interfaces* 2018, 5, 1-6.

(19) Highfield, J. Advances and Recent Trends in Heterogeneous Photo(Electro)-Catalysis for Solar Fuels and Chemicals. *Molecules* 2015, 20, 6739-6793.

(20) Wang, T.; Wang, X.; Liu, Y.; Zheng, J.; Li, X. A Highly Efficient and Stable Biphasic Nanocrystalline Ni—Mo—N Catalyst for Hydrogen Evolution in Both Acidic and Alkaline Electrolytes. *Nano Energy* 2016, 22, 111-119.

(21) Saraswat, S. K.; Rodene, D. D.; Gupta, R. B. Recent Advancements in Semiconductor Materials for Photoelectrochemical Water Splitting for Hydrogen Production Using Visible Light. *Renew. Sustain. Energy Rev.* 2018, 89, 228-248.

(22) Zhang, J.; Wang, T.; Liu, P.; Liao, Z.; Liu, S.; Zhuang, X.; Chen, M.; Zschech, E.; Feng, X. Efficient Hydrogen Production on $MoNi_4$ Electrocatalysts with Fast Water Dissociation Kinetics. *Nat. Commun.* 2017, 8, 1-8.

(23) Hao, J. Y.; Wang, Y. Y.; Tong, X. L.; Jin, G. Q.; Guo, X. Y. Photocatalytic Hydrogen Production over Modified SiC Nanowires under Visible Light Irradiation. *Int. J. Hydrogen Energy* 2012, 20, 15038-15044.

(24) Sharma, S.; Ghoshal, S. K. Hydrogen the Future Transportation Fuel: From Production to Applications. *Renew. Sustain. Energy Rev.* 2015, 43, 1151-1158.

(25) Zhang, L.; Xiong, K.; Nie, Y.; Wang, X.; Liao, J.; Wei, Z. Sputtering Nickel-Molybdenum Nanorods as an Excellent Hydrogen Evolution Reaction Catalyst. *J. Power Sources* 2015, 297, 413-418.

(26) Xiong, J.; Li, J.; Shi, J.; Zhang, X.; Suen, N.; Liu, Z. In-Situ Engineering of Double Phase Interface in $Mo/Mo_2C$ Heteronanosheets for Boosted Hydrogen Evolution Reaction. *ACS Energy Lett.* 2018, 3, 341-348.

(27) Wang, S.; Wang, J.; Zhu, M.; Bao, X.; Xiao, B.; Su, D.; Li, H.; Wang, Y. Molybdenum-Carbide-Modified Nitrogen-Doped Carbon Vesicle Encapsulating Nickel Nanoparticles: A Highly Efficient, Low-Cost Catalyst for Hydrogen Evolution Reaction. *J. Am. Chem. Soc.* 2015, 137, 15753-15759.

(28) Moni, T. P.; Splitting, W. Three-Dimensional Porous $MoNi_4$ Networks Constructed by Nanosheets as Bifunctional Electrocatalysts for Overall Water Splitting. *J. Mater. Chem. A* 2017, 5, 2508-2513.

(29) Mourdikoudis, S.; Simeonidis, K.; Vilalta-Clemente, A.; Tuna, F.; Tsiaoussis, I.; Angelakeris, M.; Dendrinou-Samara, C.; Kalogirou, O. Controlling the Crystal Structure of Ni Nanoparticles by the Use of Alkylamines. *J. Magn. Magn. Mater.* 2009, 321, 2723-2728.

(30) Luo, X.; Chen, Y.; Yue, G. H.; Peng, D. L.; Luo, X. Preparation of Hexagonal Close-Packed Nickel Nanoparticles via a Thermal Decomposition Approach Using Nickel Acetate Tetrahydrate as a Precursor. *J. Alloys Compd.* 2009, 476, 864-868.

(31) Zhang, H. T.; Wu, G.; Chen, X. H.; Qiu, X. G. Synthesis and Magnetic Properties of Nickel Nanocrystals. *Mater. Res. Bull.* 2006, 41, 495-501.

(32) Carenco, S.; Boissière, C.; Nicole, L.; Sanchez, C.; Le Floch, P.; Mézailles, N. Controlled Design of Size-Tunable Monodisperse Nickel Nanoparticles. *Chem. Mater.* 2010, 22, 1340-1349.

(33) Crist, V. Handbooks of Monochromatic XPS Spectra. *Phys. Status Solidi* 1999, 198, 5-21.

(34) Wang, X.; Su, R.; Aslan, H.; Kibsgaard, J.; Wendt, S.; Meng, L.; Dong, M.; Huang, Y.; Besenbacher, F. Tweaking the Composition of NiMoZn Alloy Electrocatalyst for Enhanced Hydrogen Evolution Reaction Performance. *Nano Energy* 2015, 12, 9-18.

(35) Zhang, Y.; Ouyang, B.; Xu, J.; Chen, S.; Rawat, R. S.; Fan, H. J. 3D Porous Hierarchical Nickel-Molybdenum Nitrides Synthesized by RF Plasma as Highly Active and Stable Hydrogen-Evolution-Reaction Electrocatalysts. *Adv. Energy Mater.* 2016, 6, 1600221.

(36) Grosvenor, A. P.; Biesinger, M. C.; Smart, R. S. C.; McIntyre, N. S. New Interpretations of XPS Spectra of Nickel Metal and Oxides. *Surf Sci.* 2006, 600, 1771-1779.

(37) Chen, X. Titanium Dioxide Nanomaterials and Their Energy Applications. *Chin. J. Catal.* 2009, 30, 839-851.

(38) Chen, Z.; Jaramillo, T. F.; Deutsch, T. G.; Kleiman-Shwarstein, A.; Forman, A. J.; Gaillard, N.; Garland, R.; Takanabe, K.; Heske, C.; Sunkara, M.; et al. Accelerating Materials Development for Photoelectrochemical Hydrogen Production: Standards for Methods, Definitions, and Reporting Protocols. *J. Mater. Res.* 2010, 25, 3-16.

(39) Liu, J.; Liu, Y.; Liu, N.; Han, Y.; Zhang, X.; Huang, H.; Lifshitz, Y.; Lee, S.-T.; Zhong, J.; Kang, Z. Metal-Free Efficient Photocatalyst for Stable Visible Water Splitting via a Two-Electron Pathway. *Science* 2015, 347, 970-974.

(40) Sun, Y.; Delucchi, M.; Ogden, J. The Impact of Widespread Deployment of Fuel Cell Vehicles on Platinum Demand and Price. *Int. J. Hydrogen Energy* 2011, 36, 11116-11127.
(41) Andrews, J.; Shabani, B. The Role of Hydrogen in a Global Sustainable Energy Strategy. *WIREs Energy Environ.* 2014, 3, 474-489.
(42) Li, Y.; Wang, H.; Xie, L.; Liang, Y.; Hong, G.; Dai, H. $MoS_2$ Nanoparticles Grown on Graphene: An Advanced Catalyst for the Hydrogen Evolution Reaction. *J. Am. Chem. Soc.* 2011, 133, 7296-7299.

The invention claimed is:

1. A method for electrocatalytic water splitting comprising electrocatalyzing a water splitting reaction in a fluid medium by providing voltage to an electrode comprising a catalyst comprised of cubic $Ni_{1-x}Mo_x$ alloy nanoparticles, wherein x ranges from 0.001 to 0.1.

2. The method of claim 1 wherein the fluid media is acidic.

3. The method of claim 1 wherein the fluid media is alkaline.

4. A method of producing discrete cubic $Ni_{1-x}Mo_x$ alloy nanoparticles, wherein x ranges from 0.001 to 0.114, comprising:
   reacting in an inert atmosphere a nickel organic compound with a molybdenum organic compound using a surfactant that includes a primary amine to produce a colloidal mixture; and
   heating the colloidal mixture to a temperature of 230-250° C. for at least thirty minutes.

5. The method of claim 3 wherein the surfactant is oleylamine.

6. The method of claim 3 further comprising the step of exposing the colloidal mixture to argon.

* * * * *